(12) United States Patent
L' Hommedieu

(10) Patent No.: X8632
(45) Date of Patent: Feb. 11, 1835

(54) AUGER, OR BIT

(76) Inventor: Ezra L' Hommedieu

Ezra L'Hommedieu of Saybrook Connecticut

Letters Patent.

The Schedule referred to in these Letters Patent and making part of the same containing a description in the words of the said Ezra L'Hommedieu himself of his improvement in the Auger or Bit.

To all Persons to whom these Presents shall come. Be it known that I Ezra L'Hommedieu of Saybrook in the County of Middlesex and State of Connecticut have invented a new and useful improvement in the auger or Bit. and that the following is a full and exact description of the construction of the same as invented or improved by me viz. The common screw Auger has a Bit consisting of a horizontal or Radius edge or lip and a perpendicular edge or lip meeting together at right angles like an angular motice chisel. The single twist Auger has but one bit. The double twist Auger has two bits or lips. arranged on opposite sides and so connected with the thread or twist, that the chips pass up in two separate columns. The improvement invented by me and for which I claim Letters Patent. are of several varieties viz. 1st In the first variety the bit of the Auger is like the common double twist auger. but there being only a single spiral cavity or twist the lip one side unites with the thread and on the other side terminates at about one fourth .. the distance around the auger which brings the chips all together as they pass up the cavity. 2. In the second variety there are three lips in the common form arranged around at equal distances. 3. In the third variety there are two cutting lips on opposite sides. On one side with the radius lip and with or without the perpendicular lip. On the other side the perpendicular lip and the radius lip meet not at right angles as in the common form but the radius edge or lip where it meets the perpendicular, lip, is depressed so as to form either an acute angle or a serpentine turn like a gouge or a marking iron. 4. In the fourth variety the Bit consists of the radius lips on opposite sides and in lieu of the perpendicular edge or lip there is on the periphery in rear of each radius lip a cutting spur projecting downwards. 5. The fifth variety has

United States Patent

Patent No.: X8632 four cutting lips, arranged at equal distances around alternately with & without
the perpendicular lips and alternately with and without the oblique an-
gled or serpentine radius lip. This and the second, third, and fourth, va-
rieties may have either a single or double twist. 6 The sixth variety
is more properly called a bit having no twist but a small plain strait
stem with a screw or centre spur on the end and a perpendicular cutting
lip and radius meeting at right angles, or obliquely or in a serpentine
form, or with a radius and cutting spur. 7. The seventh variety
is the single lip auger, with an acute angle or a serpentine turn like
a gouge or a marking iron. In testimony that the foregoing is a
true Specification or discription of my said invention improvement
or discovery. I do hereunto set my Hand at Saybrook in the State of
Connecticut this 19th day of January 1835.

Exd Witnesses
W.H.C. Joseph H. Mather Ezra L'Hommedieu
Joshua L'Hommedieu

616 [illegible]

(Patented 11 Feb 1835).
(Drawing made from Specific[illegible])